(12) United States Patent
Cohen

(10) Patent No.: US 7,010,211 B2
(45) Date of Patent: Mar. 7, 2006

(54) FIBER OPTICAL ATTENUATOR

(75) Inventor: Gil Cohen, Livingston, NJ (US)

(73) Assignee: Xtellus Inc., Florham Park, NJ (US)

( * ) Notice: Subject to any disclaimer, the term of this patent is extended or adjusted under 35 U.S.C. 154(b) by 0 days.

(21) Appl. No.: 10/657,743

(22) Filed: Sep. 5, 2003

(65) Prior Publication Data

US 2004/0120683 A1    Jun. 24, 2004

Related U.S. Application Data

(63) Continuation of application No. PCT/IL02/00188, filed on Mar. 8, 2002.

(30) Foreign Application Priority Data

Mar. 8, 2001  (IL)  ..................... 141927
Apr. 1, 2001  (IL)  ..................... 142773

(51) Int. Cl.
*G02B 6/00*        (2006.01)

(52) U.S. Cl. .......................................... 385/140; 385/3
(58) Field of Classification Search ................ 385/140, 385/31, 39, 40, 3; 349/73, 74, 76, 77, 101, 349/104
See application file for complete search history.

(56) References Cited

U.S. PATENT DOCUMENTS

| | | | | |
|---|---|---|---|---|
| 5,907,645 A | * | 5/1999 | Dupont et al. | 385/3 |
| 5,930,441 A | * | 7/1999 | Betts et al. | 385/140 |
| 6,130,731 A | * | 10/2000 | Andersson et al. | 349/77 |
| 6,141,069 A | * | 10/2000 | Sharp et al. | 349/98 |
| 6,141,076 A | * | 10/2000 | Liu et al. | 349/134 |
| 6,175,667 B1 | * | 1/2001 | Wang et al. | 385/3 |
| 6,560,396 B1 | * | 5/2003 | Yan et al. | 385/140 |

* cited by examiner

*Primary Examiner*—Juliana Kang
(74) *Attorney, Agent, or Firm*—Darby & Darby

(57) ABSTRACT

A fiber optical attenuator utilizing the cut-off phenomenon for single mode propagation of an optical wave down a single mode fiber, comprising an element such as a pixelated liquid crystal element, capable of spatially changing the phase across the cross section of an input optical signal. Such a spatial phase change is equivalent to a change in the mode structure of the propagating wave. The signal propagating in the single mode output fiber is attenuated in accordance with the extent to which higher order modes are mixed into the low order mode originally present. When the mode is completely transformed to higher order modes, the wave is effectively completely blocked from entering the output single-mode fiber, and the attenuation is high. The level of attenuation is determined by the fraction of the wave which is converted to modes other than the lowest order mode, and is thus controllable by the voltage applied to the pixels of the liquid crystal element.

12 Claims, 7 Drawing Sheets

FIBER OPTICAL ATTENUATOR

This patent application is a continuation of International Application No. PCT/IL02/00188 which was filed Mar. 8, 2002 and designates the United States of America. This International Application was published in English under International Publication No. WO 02/071133.

FIELD OF THE INVENTION

The present invention relates to the field of optical attenuators, and especially electronically variable attenuators suitable for use in fiber optical applications.

BACKGROUND OF THE INVENTION

Variable attenuators are important components in fiber optical test and measurement instrumentation and in fiber optical communication systems. The requirements of optical attenuators for use in such systems are that they should vary the intensity of the light transmitted without appreciably altering the spatial, temporal, spectral or polarization distribution of the light beam, and that they should be polarization insensitive.

Many types of variable attenuators have been described in the prior art. Mechanically variable attenuators, such as those using moveable or rotatable graded neutral density filters, or movable absorbing sections inserted into the optical path are bulky, complex and slow, and so are unsuitable for fast response optical communication use.

Electronically controlled fiber optical variable attenuators have been described in a number of prior art patents. In U.S. Pat. No. 6,055,104 there is described a variable attenuator which uses a polarizing beam splitter and a polarization rotator, which could be a Faraday rotator, a magneto-optical effect crystal, or a liquid crystal. Variable attenuators using similar schemes of polarization rotation and control elements are described in U.S. Pat. Nos. 5,999,305, 5,978,135, 5,973,821, 5,963,291, 5,867,300 and 5,727,109, and in the numerous previous references cited in these Patent documents.

All of these variable attenuators are generally complex in construction, in that they usually involve at least three optical elements, a polarizing element, an electro-optical polarization control element and an analyzing element. Furthermore, since these prior art attenuators depend for their operation on manipulation of the polarization of the wave being attenuated, care must be taken in their design and construction to ensure that they do not alter the polarization characteristics of the optical signal, thereby affecting the possible dispersion of the signal in its onward transmission. In particular, the attenuator design should ensure that the attenuation does not vary with change in the polarization of the input signal. This means that the polarization dependent loss should be made as small as possible, which is generally accomplished by equalizing the attenuation of the two orthogonal polarizations of the signal.

In U.S. Pat. No. 6,175,667 to F. Wang et al., for "High speed polarization insensitive electro-optical modulator", there is described a device for use with fiber-optic cables for polarization insensitive amplitude modulation of light comprising a planar electro-optic layer with a reflective conductive mirror electrode on one side and a pair of transparent conductive electrodes on the other, separated along a straight line by a small gap. Light from the input fiber is directed onto the transparent electrodes, through the electro-optic layer and to the mirror from which it is reflected and refocused onto the output fiber. Application of a voltage between either of the transparent electrodes and the reflecting electrode changes the optical path length for half the beam so that when it is refocused on the output fiber, the two halves interfere constructively or destructively, depending on the change in path length and hence on the phase difference between the two halves. The electro-optic layer, depending on the type of effect utilized, changes either its refractive index or its length on application of the voltage in the direction of the propagation, and thus introduces the desired phase shift.

Though the above-mentioned device has the advantage of being, in its basic form, polarization insensitive, it has one major disadvantage. The opto-electric effects used to change the refractive index or the length of the isotropic materials are generally small or insensitive effects, and the electro-optic layer must therefore be thick in order to obtain adequate phase retardation. Alternatively, a comparatively high voltage must be applied between the electrodes, with all of the concomitant problems of generating, controlling and using such a voltage. According to the description in the Wang et al patent, a thick layer also results in a substantial fringing field at the intersection between the split electrodes, which in fact does cause the device to be polarization sensitive. A multiple layer structure is suggested in the Wang et al. patent to overcome the voltage problem and the addition of a quarter wave plate to such a structure to overcome the polarization sensitivity problems, but these additions complicate the structure of the device. Furthermore, as is known in the art, the use of a thick layer, even if divided, generally results in a higher insertion loss for the device.

There thus exists an important need for a simple, electronically controllable variable attenuator, which operates at low control voltages, has low insertion loss, and is insensitive to the polarization of the input optical signal.

The disclosures of each of the publications mentioned in this section and in the other sections of the specification, are hereby incorporated by reference, each in its entirety.

SUMMARY OF THE INVENTION

The present invention seeks to provide a new variable fiber optical attenuator which is compact, polarization insensitive, operable at low voltage, wavelength independent, simple in construction and operation, and of low manufacturing costs. The attenuator utilizes the cut-off phenomenon for single mode propagation of an optical wave down a single mode fiber. It is known that the dimensions of a single mode fiber are such that it can only support the lowest order mode of propagation, which is generally the fundamental mode, ideally having a Gaussian cross section. A wave with a higher order mode cannot propagate down the small dimension of the single mode fiber, and thus suffers strong attenuation.

There is thus provided in accordance with a preferred embodiment of the present invention, a variable attenuator consisting of an element capable of changing the phase of part of the cross section of an optical wave. Such a spatial phase change is equivalent to a change in the mode structure of the propagating wave. The aforementioned element is preferably disposed between the ends of two closely positioned single-mode fibers, such that any optical wavefront coupling from one fiber to the other has to traverse the element. So long as the element is not activated, the lowest mode of propagation is unaffected, and the attenuator transfers the signal essentially unattenuated from the input fiber to the output fiber. If the element is activated such that the phase distribution in the wave passing through is changed, the signal will be attenuated in accordance with the extent to which higher order modes are mixed into the low order mode originally present. When the mode is completely transformed to higher order modes, the wave is effectively completely blocked from entering the output single-mode fiber, and the attenuation is high. The level of attenuation is determined by the fraction of the wave which is converted to modes other than the lowest order mode. The light entering the output fiber in the higher order modes, which cannot propagate freely, leaks into the cladding of the fiber and gets scattered or absorbed by the fiber outer jacket.

A preferred element for performing the mode change is a liquid crystal element. In such an element, the applied control voltage changes the phase of light traversing it by rotation of the optical axis from a direction parallel to the light propagation direction, to a perpendicular direction, or vice versa. Rotation of the optical axis in such liquid crystals can be achieved with low voltages, and in very thin elements. The effective phase change is generated by switching between use of the refractive indices in the extraordinary and the ordinary directions, by means of appropriate arrangement of the polarization directions of the light relative to the optical axis in passage through the liquid crystal. No attempt is made to control the phase by change of the refractive indices themselves of the liquid crystal element. In this respect, the device is quite different from the prior art devices of Wang et al., wherein phase change is effected by change in the bulk refractive index itself of the propagation medium.

The cross section of the liquid crystal element is preferably divided into pixels such that each pixelated part can be switched separately. The choice of pixel pattern in the liquid crystal element determines the spatial pattern of phase change impressed upon the traversing wave, and hence the higher order mode generated by the element. The fraction of the mode-transformed optical power transmitted by the attenuator is dependent on the degree of phase change imparted by the switched pixels. When the phase change is slight, only a small fraction of the incident wave is transformed into the selected higher order mode. When the phase change is $\pi$, all of the incident wave is transformed into the selected higher order mode, and the attenuation is maximum. This situation exists when the pixel pattern is symmetric and the resultant phase pattern is anti-symmetric. The voltage impressed across the liquid crystal element thus controls the attenuation of the device. It is to be understood that although a liquid crystal element is a convenient, low cost and widely available element, the phase changing element can be of any suitable type, such as one based on the Faraday effect, the magneto-optical effect, the electro-optical effect, or any other suitable opto-electrical effect. Furthermore, it is possible to use micro-mechanical means, such as a MEMS device for inducing the phase change, for instance by inserting an additional medium path in half of the beam pass, or by moving a reflective mirror to increase the beam path of half of the beam.

Optical transmission down fibers results in the mixing of the polarizations of the transmitted signals, because of a number of known mechanisms, such as, for instance, the physical rotation of fiber itself coupled with small levels of local birefringence of the single mode fiber. A very important aspect of attenuator operation is therefore that it be polarization insensitive, since the polarization of the input signal is generally unknown, mixed, and varying with time. Since the attenuator according to the present invention is not directly dependent for its operation on the polarization properties of the transmitted light, the attenuator, if correctly designed, can thus be made essentially polarization independent. In order to be so, the attenuator has to act uniformly on all polarization states. However, the operation of a liquid crystal device usually depends on the polarization of the input light. For example, an electric field applied to a parallel nematic liquid crystal cell affects only the phase of the linear component of the polarization which is parallel to the alignment layers on the cell boundaries. For this reason, if a liquid crystal, for example, is used as the phase shifting element in the attenuator of the present invention, the element must be so selected and arranged that any inherent polarization effects are preferably self-canceling or self-compensating.

In the attenuator of the present invention, polarization insensitivity is ensured by one of several preferred methods. The first method is by optimizing the phase changing element or elements such that both orthogonal phase components into which an incident wave can be divided, undergo the same phase change. This can preferably be achieved either by the use of two identical phase-changing elements in series, each providing complementary phase changes for the two orthogonal polarization components of the input signal, or alternatively by the use of a pair of serial twist-geometry nematic liquid crystals, having the same overall twist angle but with the twist directions reversed, and disposed such that at the transition between said crystals, the mutual alignment of the twist structure is 90°, this combination having the same total phase change for the two orthogonal polarization components of the signal. Another preferred method is the use of a liquid crystal element with separate pixels having orthogonal aligning layers, and having at least a 2-fold symmetry, such that any change in phase arising from one part of the element on one of the orthogonal components of the input signal, is compensated by the same change in phase on the other orthogonal component arising from a symmetrically opposite part of the element. As a consequence, regardless of the polarization direction of the light incident on it, the phase changing element will affect the relative phase distribution across the wavefront in the same way, thus resulting in polarization insensitive operation.

The variable optical attenuator described above operates in a guided wave mode. According to other preferred embodiments of the present invention, it can also be constructed to operate in a free space mode.

Furthermore, the variable optical attenuator described hereinabove can be constructed to operate in a transmission mode or in a reflection mode, unlike the prior art devices mentioned in Wang et al., in which are described reflective devices only.

Furthermore, the variable optical attenuator described above is constructed of discrete components. According to other preferred embodiments of the present invention, the variable optical attenuator can also be constructed by means of integrated optics techniques on a single semiconductor substrate, such a silicon, with the detector, the liquid crystal device drive circuits and the control electronics all integrated into one chip, and the liquid crystal device itself intimately mounted on the chip.

Furthermore, the variable optical attenuator described above is constructed with the cross section of the phase changing element divided into pixels such that each pixelated part can be controlled or switched separately. It is to be understood that the use of the term pixels throughout this application, and as claimed, is not meant to be limited to pixels defined by discrete pixelated electrodes on the surface of the element, as conventionally understood by the term, but can preferably refer to any method of ensuring that part or parts of the element are controlled or switched differently from other parts. These parts are thus termed "pixels". Such pixels can be defined, in one preferred example, by electric fields induced into the element by electrodes remotely located from the pixels to be switched, or not immediately above the pixels to be switched.

Furthermore, the optical attenuators described above are variable optical attenuators. According to other preferred embodiments of the present invention, the attenuator can be a fixed attenuator with a predetermined attenuation value according to the fixed phase element used in the device.

In accordance with yet another preferred embodiment of the present invention, there is provided variable optical attenuator consisting of an input fiber for receiving an input optical signal to be attenuated, an output fiber for outputting the attenuated optical signal, at least one phase changing element disposed in the optical path between the input fiber and the output fiber, and a drive source operative to change the phase of light passing through at least part of the at least one element.

In the variable optical attenuator described above, the change in the phase of light passing through the at least part of the at least one element may be operative to change the mode structure of at least part of the input optical signal such that that part of the input optical signal cannot propagate freely in the output fiber.

In accordance with still another preferred embodiment of the present invention, in the variable optical attenuator described above, the input optical signal may have an effectively fundamental mode structure and the output fiber may be a single mode fiber, such that the mode structure of at least part of the input optical signal is changed to a higher order mode, and as a result, that part of the input signal cannot propagate freely through the output fiber.

There is further provided in accordance with yet other preferred embodiments of the present invention, variable optical attenuators as described above, and wherein the at least one phase changing element is a liquid crystal element. The at least one phase changing element may preferably consist either of a serial pair of parallel aligned liquid crystals, orthogonally aligned such that the attenuator is insensitive to the direction of polarization of the optical signal, or a serial pair of twist geometry liquid crystals, having the same overall twist angle but with the twist directions reversed, and disposed such that at the transition between said crystals, the mutual alignment of the twist structure is 90° such that the attenuator is insensitive to the direction of polarization of the optical signal, or a liquid crystal divided into at least two orthogonally aligned pixels, such that the attenuator is insensitive to the direction of polarization of the optical signal.

In accordance with still more preferred embodiments of the present invention, there are provided variable optical attenuators as described above, and wherein the phase changing element is either an electro-optic element, or a Faraday effect element or a magneto-optical element.

Furthermore, the part of the element may preferably be defined by at least one pixel on the element, or by two pixels, or by four pixels. In the later case, the drive source is operative to change the phase of light passing through two diagonally opposite ones of the four pixels.

There is further provided in accordance with still other preferred embodiments of the present invention, variable optical attenuators as described above, and wherein the input fiber and the output fiber are disposed such that light passes by transmission between them, or wherein the attenuator also includes a reflecting surface and the input fiber and the output fiber are disposed such that light passes by reflection between them. The reflecting surface may preferably be formed on the rear side of the phase changing element.

Furthermore, in the variable optical attenuators described above, the at least one pixel may be formed by means of at least one pixelated electrode located essentially over the at least one pixel, or by means of at least one electrode located remotely from the at least one pixel.

In accordance with a further preferred embodiment of the present invention, there is also provided an optical attenuator consisting of an input fiber, an output fiber and at least one phase changing element operative to change the phase of part of the cross section of light passing from the input fiber to the output fiber.

In addition, the change in the phase of part of the cross section of light passing from the input fiber to the output fiber may preferably be such that the mode structure of the light is changed such that the light cannot propagate freely in the output fiber.

Furthermore, the input fiber may preferably be a single mode fiber, and the output fiber a single mode fiber, and the mode structure of at least part of the light thus changed to a higher order mode, such that the part of the light cannot propagate freely in the output fiber.

There is provided in accordance with yet a further preferred embodiment of the present invention, an optical attenuator as described above, and wherein the at least one phase changing element is a liquid crystal element.

Furthermore, the at least one phase changing element may preferably consist either of a serial pair of parallel aligned liquid crystals, orthogonally aligned such that the attenuator is insensitive to the direction of polarization of the light, or a serial pair of twist geometry liquid crystals, having the same overall twist angle but with the twist directions reversed, and disposed such that at the transition between the crystals, the mutual alignment of the twist structure is 90° such that the attenuator is insensitive to the direction of polarization of the light, or a liquid crystal divided into at least two orthogonally aligned pixels, such that the attenuator is insensitive to the direction of polarization of the light.

In accordance with yet more preferred embodiments of the present invention, in the variable optical attenuator described above, the at least one liquid crystal element may consist of a serial pair of parallel aligned liquid crystals with a half wave plate disposed between them, such that the attenuator is insensitive to the direction of polarization of the optical signal. The half wave plate may preferably be operative as a cover plate, or the substrate, or an aligning layer for one of the liquid crystal elements.

Alternatively and preferably, the at least one liquid crystal element may consist of a liquid crystal with a quarter wave plate disposed in proximity to the liquid crystal, and may also incorporate a reflecting surface, the input fiber and the output fiber being disposed such that light passes by reflection between them. According to more preferred embodiments, the reflecting surface may be formed on the rear side of the quarter wave plate, or it may be operative as a cover plate, or the substrate, or an aligning layer for the liquid crystal element.

In addition, according to other preferred embodiments of the present invention, the at least one phase changing element may be pixelated.

There is even further provided in accordance with a preferred embodiment of the present invention, an optical attenuator as described above, and wherein the change in the phase of part of the cross section of light is effected by means of electrodes associated with the at least one phase changing element. The attenuator may then preferably be a variable attenuator.

Furthermore, in accordance with yet another preferred embodiment of the present invention, there is provided an optical attenuator as described above, and wherein the input fiber and the output fiber are disposed such that light passes by transmission between them, or alternatively, wherein the optical attenuator also includes a reflecting surface, and the input fiber and the output fiber are disposed such that light passes by reflection between them.

There is even further provided in accordance with a preferred embodiment of the present invention, an integrated phase changing element for use in a variable optical attenuator, consisting of a pixelated phase changing element, at least one detector element, and drive circuitry for controlling the phase change introduced in the passage of light through at least one of the pixels of the pixelated phase changing element.

There is further provided in accordance with yet other preferred embodiments of the present invention, an optical mode-converter comprising an input fiber, an output fiber and at least one phase changing element operative to change the phase of part of the cross section of light passing from said input fiber to said output fiber. Furthermore, many of the above mentioned embodiments of variable optical attenuators can be operative as mode converters, if the output fiber is selected such as to be able to support the mode to which the device converts the input signal. Such embodiments differ from the attenuator embodiments in that in the attenuator embodiments, the output fiber type is selected specifically to prevent propagation of the converted mode, and thus to attenuate the input signal, whereas the mode converter embodiments allow the converted mode to propagate. The output fiber is then selected to be a high mode fiber. According to yet further preferred embodiments, such a mode converter could even operate with free-space propagation.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
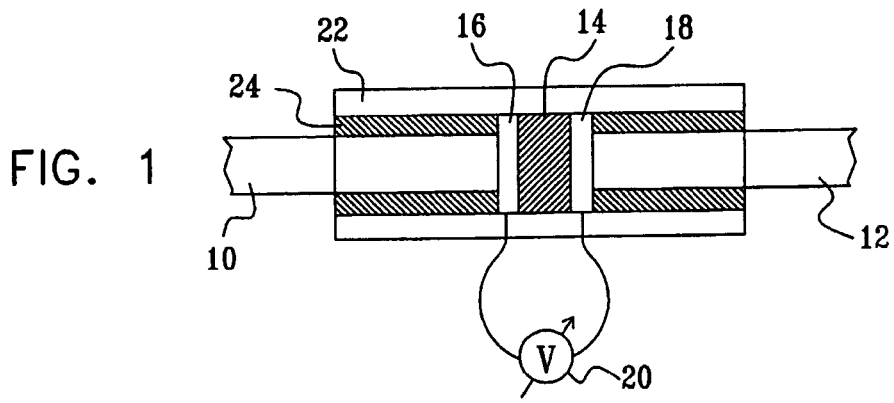
FIG. 1 is a schematic illustration of a variable fiber optical attenuator, constructed and operative according to a preferred embodiment of the present invention.

Reference is now made to FIG. 1, which illustrates schematically a variable fiber optical attenuator, constructed and operative according to a preferred embodiment of the present invention. The attenuator consists of two sections of single-mode optical fiber 10, 12, between whose ends is disposed a liquid crystal element 14, such that light passing from the end of one of the fibers to the other must traverse the liquid crystal film. The liquid crystal element 14 preferably has transparent electrodes 16, 18 deposited on its faces, such that switching can be simply accomplished by application of a variable voltage 20 across the electrodes. The electrodes are pixelized (not visible in this side view, but shown in FIGS. 2 and 3A and 3B below), so that preselected sections of the liquid crystal element can be switched separately. The fiber end sections and the liquid crystal element are rigidly held in contact, preferably by means of an external sleeve 22, and a sealant material 24 inside the sleeve supports the components in a stress-free and hermetic manner. When no voltage is applied to the electrodes, the whole of the liquid crystal is optically uniform and induces a uniform phase shift into the light traversing it, in accordance with the optical path length of the liquid crystal. Essentially all of the input optical power in fiber 10 passes into the output fiber 12 without any spatially differential phase change, and consequently, is able to propagate through the output fiber virtually without insertion loss. Since the thickness of the liquid crystal phase changing element need be only a few microns, the insertion loss can be reduced to very small levels.

Figure 2:
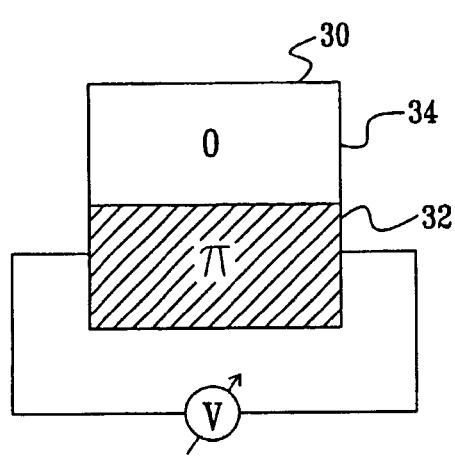
FIG. 2 is a view in the direction of the light propagation, of the cross-section of a pixelated liquid crystal element, for use in the variable optical attenuator shown in FIG. 1.

The operation of the attenuator of FIG. 1 can be elucidated by reference to FIG. 2, which is a view in the direction of the light propagation, of the cross-section 30 of a preferred liquid crystal element, for use in such a variable optical attenuator. Each of the electrodes on the surfaces of the element has two pixels, dividing the element into two halves. The control voltage is applied, preferably to one of the pixels 32, and at its maximum designed value, modifies the liquid crystal under that pixel, such that the light passing through the pixel is phase shifted by $\pi$ relative to its phase without any voltage applied. The liquid crystal under the other pixel 34 is unchanged. The whole of the light passing through the liquid crystal element is therefore transformed such that it has an anti-symmetric field distribution, which cannot couple to the symmetric fundamental lowest order mode of the fiber. The light is converted to the $HE_{12}$ and higher order asymmetric modes, which cannot propagate in the fiber. The attenuator is then at its maximum value, ideally fully blocking the light passage. For intermediate values of applied voltage, when the additional phase shift for the light passing through pixel 32 is less than $\pi$, only part of the light is transformed to the anti-symmetric, higher order mode, and the light is thus partially attenuated. The level of light transmitted is thus a function of the applied voltage. It is to be understood that though the electrode structure of FIG. 2 has been described in terms of two separate electrodes on each surface, each covering a pixel of half of the surface, in practice, there is need for a phase control electrode preferably only on one half of the element in order to generate the higher order antisymmetric mode.

Figure 3A:
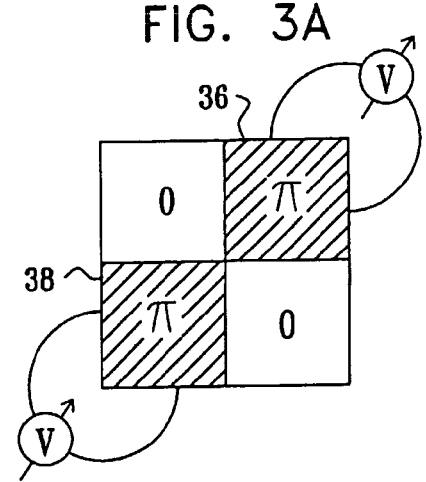
FIGS. 3A and 3B show alternative preferable pixel arrangements to that shown in FIG. 2, in which the liquid crystal is divided respectively into four pixels and into pixelated strips.
Figure 3B:
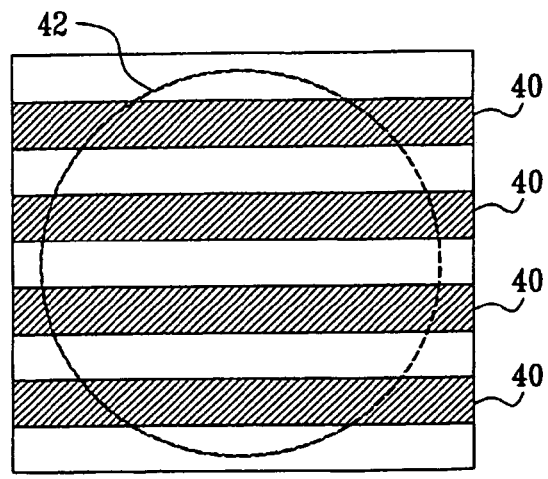

Reference is now made to FIGS. 3A and 3B, which show other preferred pixel arrangements, for preferred use in the present invention. In the embodiment shown in FIG. 3A, the liquid crystal is divided into four pixels, unlike the prior art modulator elements shown in the Wang et al., U.S. Pat. No. 6,175,667, wherein is described division of the phase shifting element into only two diametrically opposite halves. In the embodiment of FIG. 3A, the control voltage is applied to two diagonally opposite pixels 36, 38. For clarity, the drive voltages are shown schematically in FIG. 3A as coming from separate sources, though it is to be understood that they will generally come from one source.

In the preferred embodiment shown in FIG. 3B, the liquid crystal is divided by means of strip electrodes 40 into an even number of strip pixels running across the element, which divides the element into approximately equal pixelated and non-pixelated areas. The control voltage is applied between these strip electrodes and the back electrode of the liquid crystal, and is operative to convert the light beam passing through the element into a high order multimode configuration. The advantage of this geometry arises because of the way in which the traversing beam 42 overlaps the stripped pixelated geometry. The effect of transverse motion of the beam relative to the element is greatly reduced, compared to the embodiment of FIGS. 3A, and even more so to that of FIG. 2, wherein even small movements of the beam can upset the symmetry of the applied phase shift, and interfere with the operation of the attenuator.

Although the invention has been described only in terms of the pixel configurations shown in FIGS. 2, 3A and 3B, which result in the production of the above-mentioned higher order mode patterns respectively, it is to be understood that the invention is equally operative when the liquid crystal element produces other mode structures which cannot be propagated by the single mode fiber at the output to the attenuator.

Figure 4:
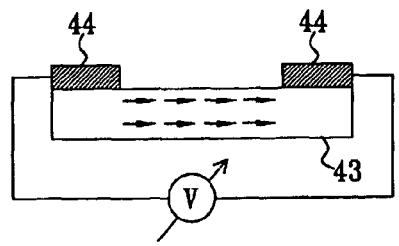
FIG. 4 is a schematic side view of a liquid crystal element, according to a further preferred embodiment of the present invention, in which the electrodes for applying the electric field for controlling the liquid crystal are located at the side of the crystal.

The embodiments shown in FIGS. 2, 3A and 3B have been described using transparent pixelated electrodes located above the pixelated areas of the liquid crystal device where it is desired to change the phase. Reference is now made to FIG. 4, which shows a further preferred embodiment of the present invention, in which the pixelated areas are defined by means of electrodes located remotely from those areas themselves. FIG. 4 is a schematic side view of a liquid crystal element 43, according to a further preferred embodiment of the present invention, in which the electrodes 44 for applying the electric field for controlling the liquid crystal are located at the side of the crystal. The electrode pattern and the control voltages applied to them are arranged to be such that a field gradient is set up across the element, which defines pixel areas where the phase is changed, and other pixel areas where it is not. Since the electrodes do not cover the central area of the element, through which the optical signal passes, they do not have to be transparent.

Furthermore, although the pixel structure and their drive voltages are shown in FIGS. 2, 3A and 3B, and in the following figures, in a schematic form, it is understood that known microelectronic methods and techniques could be used to pixelize the liquid crystal and provide the drive voltage circuits.

Furthermore, although the above preferred embodiments have been described using a liquid crystal element as the phase changing element, and drive voltages as the control parameter acting thereon, it is to be understood that the invention can also be executed using other types of phase changing elements, and other forms of drive control, such as current drives, as appropriate.

Furthermore, although the above preferred embodiments have been described using a single liquid crystal element controlling the phase change over the whole of the traversing optical beam, it is possible to spatially change the phase over the beam in any other suitable geometric arrangement of elements. Some of these arrangements are shown in FIGS. 5A to 5C.

Figure 5A:
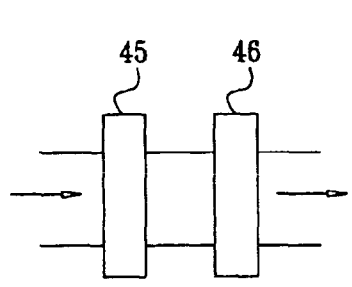
FIGS. 5A to 5C illustrate several different geometrical methods from that shown in FIG. 1, of arranging phase changing elements to spatially change the phase over the input beam.

FIG. 5A is a schematic view of a series pair of phase changing elements 45, 46, wherein each phase changer controls the phase of part of the beam passing through it. The pixel geometry and drive arrangements may become accordingly simpler in such an embodiment.

Figures 5B, 5C:
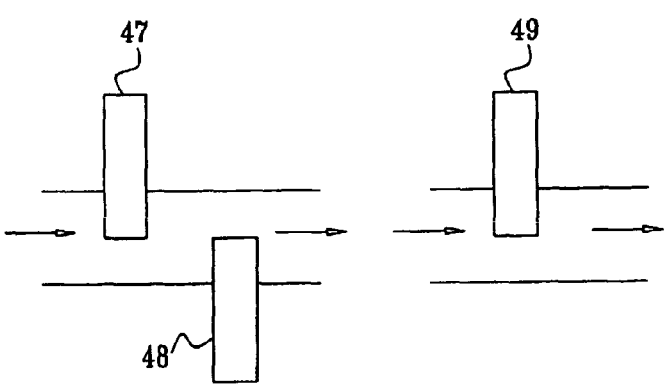

FIG. 5B is a further preferred embodiment, wherein the two elements 47, 48, are offset, such that each of the different spatial parts of the beam whose phase is to be controlled, passes through its own phase control element.

FIG. 5C is even a further preferred embodiment, wherein only one phase changing element 49 is used, but unlike the embodiments of FIGS. 2 and 3, this element is disposed such that only part of the beam passes through it. That part is then phase changed by the single element 49, thus generating the higher order mode required for the operation of the attenuator.

In explaining the operation of the attenuators of the above-described embodiments of the present invention, although reference is sometimes made to input and output fibers, it is to be understood that except where specifically stated to the contrary, the attenuators are non-directional devices, and operate equally well with the light signal incident from either end, both hereinabove and in the descriptions of successive embodiments.

The attenuation values attained for any given control voltage can be stabilized by the use of known temperature control techniques for the component, thereby improving stability and performance. Preferred methods for doing so include use of a heating element which keeps the component stabilized at a temperature above the ambient, or by means of a Peltier heating/cooling element.

Figure 6:
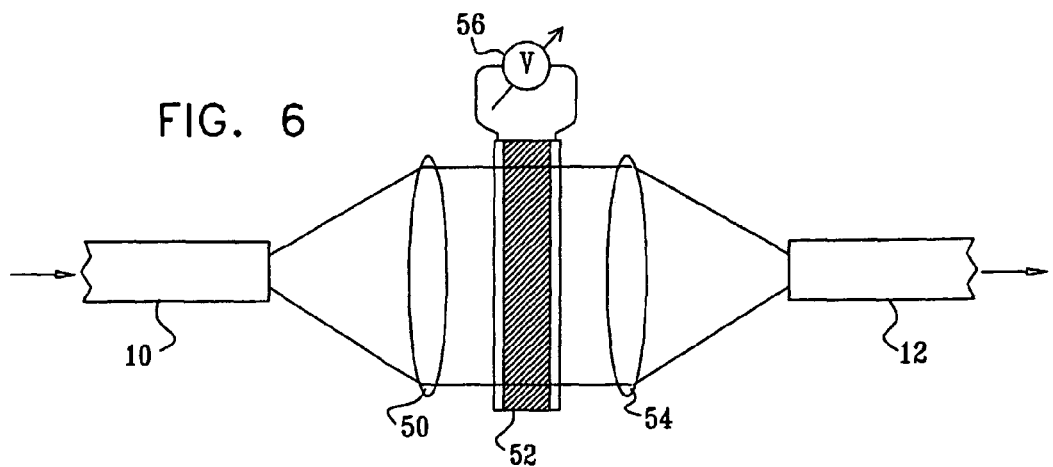
FIG. 6 is a schematic illustration of another preferred embodiment of an optical attenuator according to the present invention, similar to that shown in FIG. 1, but executed in free space.

Reference is now made to FIG. 6, which is a schematic illustration of another preferred embodiment of the present invention, similar to that shown in FIG. 1, but executed in free space instead of in a waveguide-like structure. The attenuator consists, like FIG. 1, of two sections of single-mode optical fiber, an input section 10, and an output section 12. The signal emerging from the end of the input fiber 10 diverges in free space and is collimated by the lens 50. The signal then traverses the phase changing element 52, and is focused by a second lens 54 onto the end of the output fiber 12. As in the previously described embodiments, the phase changing element 52 is controlled by a variable applied voltage 56 to change the mode pattern of the wave traversing the element. The phase changing element 52 is preferably a pixelized liquid crystal device.

Figure 7:
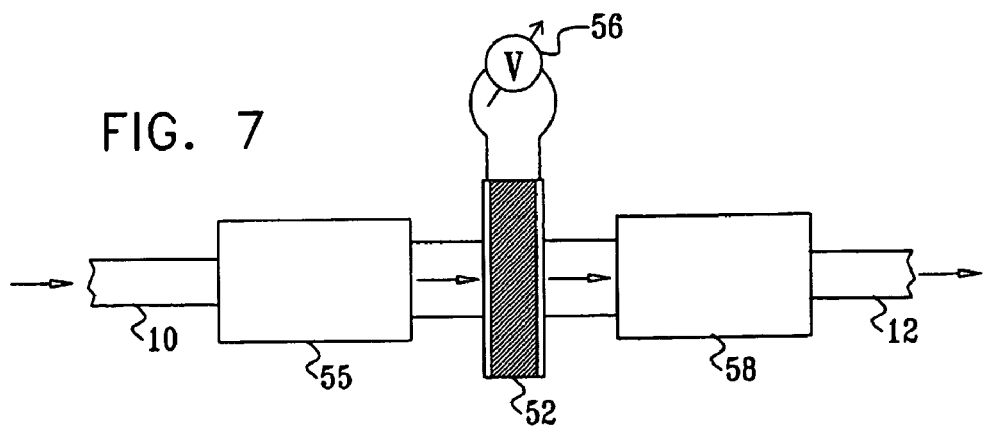
FIG. 7 is a schematic illustration of another preferred embodiment of the present invention, similar to that shown in FIG. 6, but using a GRIN (graded index) lens for producing a collimated beam of light instead of the free space embodiment with a conventional lens shown in FIG. 6.

Reference is now made to FIG. 7, which is a schematic illustration of another preferred embodiment of a variable optical attenuator according to the present invention, similar to that shown in FIG. 6, but using a GRIN lens rod 55 for producing a collimated beam of light instead of the free space embodiment with a conventional lens, as shown in FIG. 6. A second GRIN lens rod 58 is then preferably used for focussing the phase-amended beam into the output fiber 12. This embodiment has an advantage that it can be constructed much more compactly and in a more integrated manner than that of FIG. 6.

Figure 8:
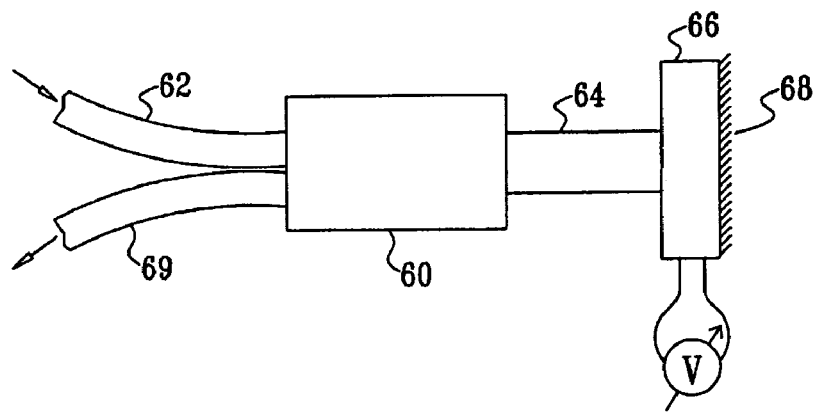
FIG. 8 is a schematic illustration of a variable optical attenuator according to another preferred embodiment of the present invention, using a dual fiber collimator in a reflective embodiment.

Reference is now made to FIG. 8, which is a schematic illustration of a variable optical attenuator, constructed and operative according to another preferred embodiment of the present invention. This embodiment is a reflective embodiment, which uses a dual fiber collimator 60 as the input/output device. The signal to be attenuated is input by the fiber 62, and is converted by the dual fiber collimator 60 into a collimated output beam 64. This output beam traverses the electrically variable phase changing element 66, which is preferably a pixelized liquid crystal element, and is reflected at the rear side of this element 66, either by means of a reflective coating 68 on the rear surface, or by means of a separate mirror element behind the phase changing element. The spatially phase-amended, reflected beam re-enters the dual fiber collimator 60, and the level of the signal which can be recoupled from the output fiber 69, is dependent on the fraction of the input light which has been transformed into higher order asymmetric modes. In this way, the attenuation level can be varied by the applied voltage on the variable phase change device 66.

Figure 9:
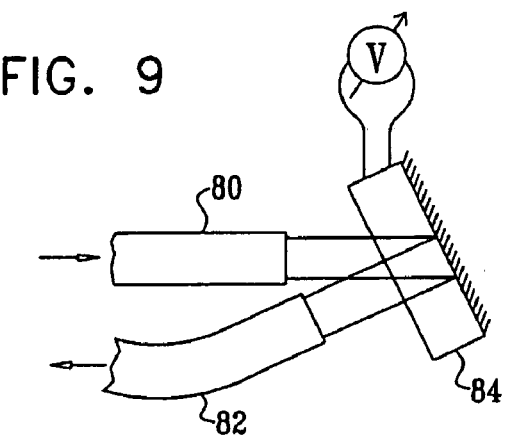
FIG. 9 is a schematic illustration of another preferred embodiment of the present invention, similar to that shown in FIG. 8, but executed in free space from the ends of the input and output fibers instead of using a dual fiber collimator.

Reference is now made to FIG. 9, which is a schematic illustration of another preferred embodiment of the present invention, similar to that shown in FIG. 8, but executed in free space instead of using a dual fiber collimator. The input and output signals to and from the attenuator are via the ends of two single mode fibers, 80, 82, aligned at an angle to each other, and positioned closely in front of a reflective variable phase changing element 84, similar to that shown in FIG. 8. The reflective phase changing element, preferably a pixelated liquid crystal device, is aligned with its normal at the bisecting angle between the two fiber ends, such that light emitted from the input fiber passes through the phase element 84, has its mode structure changed according to the setting of the phase changing element, and is reflected back into the output fiber 82, wherein the level propagated depends on the extent of higher order asymmetric modes in the output light.

Figure 10:
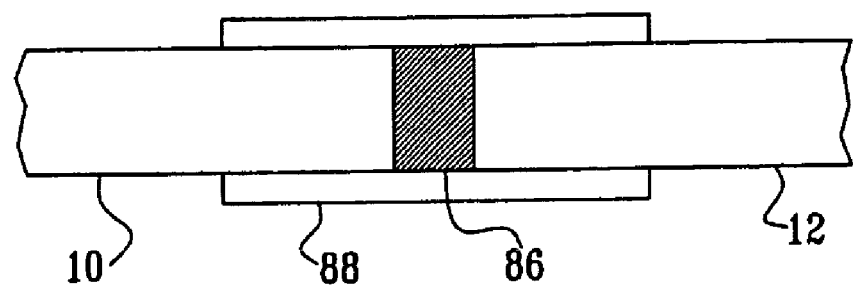
FIG. 10 is a schematic illustration of a fixed fiber optical attenuator, constructed and operative according to another preferred embodiment of the present invention.

Reference is now made to FIG. 10, which is a schematic illustration of a fixed fiber optical attenuator, constructed and operative according to another preferred embodiment of the present invention. This embodiment is similar to that shown in FIG. 1, except that the phase-changing element 86 is fixed, and the support sleeve 88 does not need to convey any electrical control signals, as in FIG. 1. The attenuation value is predetermined according to the fixed phase-changing element used in the device. This embodiment is therefore particularly simple in construction.

Furthermore, according to other preferred embodiments of the present invention, the conversion of the transmitted light into higher order asymmetric modes can also be achieved by the insertion of an asymmetric attenuating film into the beam path, instead of the use of an asymmetric phase shifting element. Such an embodiment is also represented by the device shown in FIG. 10, but for this embodiment, the element marked 86 would be an asymmetric attenuating element. Though the use of attenuating films is known in prior art attenuators, to the best of the inventor's knowledge, such films are used to attenuate the transmitted signal directly by absorption. According to this embodiment of the present invention, a comparatively low attenuation, asymmetric film can degrade the symmetry of the beam, so that the fundamental mode of propagation is depressed, and the transmission through the single-mode output fiber is attenuated far in excess of the effect of the direct attenuation in power resulting from the attenuating film in the optical path.

Figure 11:
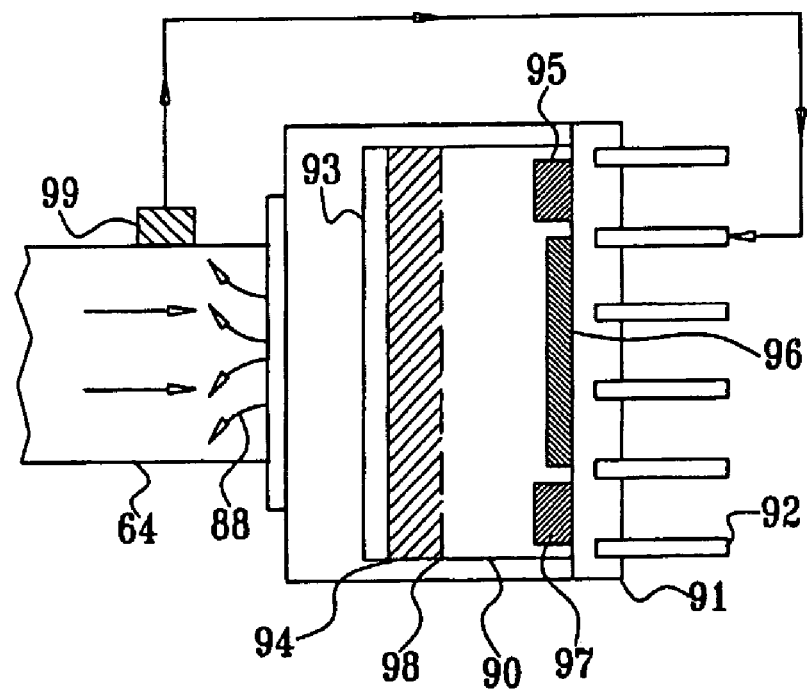
FIG. 11 is a schematic illustration of a preferred embodiment of an integrated phase changing element, for use as a variable optical attenuation control element, according to the present invention.

Reference is now made to FIG. 11, which is a schematic illustration of an integrated reflective phase changing element, for use as a variable optical attenuator, according to another preferred embodiment of the present invention. The integrated element can be used in any of the above shown reflective attenuator embodiments, and especially that shown in FIG. 9. The element differs from those described hereinabove, in that it preferably incorporates a photodetector element and electronic circuitry, such that the element can be used as an integrated feedback controller for maintaining the attenuation at a predefined level. The element is preferably constructed on a substrate of silicon 90, on which all of the opto-electronic elements and circuits are integrated. The substrate is preferably mounted on an integrated circuit header 91, with socket pins 92 for making input and output and power supply connections. The input/output fiber 64 is attached optically to the front cover of the integrated housing, and one or more detectors 99 are located around the periphery of the fiber near its entry into the unit. The output signal from this detector or detectors is input to detector amplifier circuitry 97, preferably executed on the silicon substrate.

A phase changing element 94, such as a liquid crystal device, is preferably incorporated into the device at the front of the substrate, and is protected by means of a thin glass cover plate 93, which also preferably incorporates transparent switching electrodes, defining the pixels of the element. The liquid crystal material is thus sandwiched between the glass front cover plate 93, and the front surface 98 of the silicon substrate. The drive circuits 95 for the electrodes are preferably integrated into the silicon substrate. The front surface 98 of the silicon substrate is optically polished to provide a reflective surface for the attenuator. The amplified electronic output signal from the detector circuit 97 is used as a control signal for the liquid crystal element, to determine the attenuation level of the complete device.

The attenuation change is detected by means of the level of the light which leaks into the cladding 88, from the reflected light that enters the output fiber. The level of light leaking in this manner is proportional to the level of light not coupled into the output fiber because its mode has been degraded by means of the phase shift imparted by the phase shifting element, and this light level is thus proportional to the attenuation level of the device. In FIG. 11, the reflected phase-shifted light having a higher order asymmetric mode of propagation, and therefore incapable of being propagated back down the connection fiber 64, is shown being deflected to the sides 88, where it is detected by the one or more detector units 99 positioned at the side of the fiber. This signal is dependent on the attenuated output signal of the attenuator, and is input to the relevant integrated silicon amplifier circuits, where it is compared with an externally provided reference level signal corresponding to the attenuation level desired, and also input to the silicon circuit. The resulting difference signal is amplified to generate a variable voltage which is used to adjust the phase change induced into the relevant spatial sections of the liquid crystal phase changing element 94, thus maintaining a constant and stable output level.

The phase changing element itself is precalibrated such that the attenuation produced by the complete variable optical attenuator unit is a well-defined function of the reference voltage applied to the unit. Thus, application of a specific voltage leads to a corresponding attenuation of the input light signal. In order to ensure accurate correspondence between the applied voltage and the attenuation, it may be necessary to temperature stabilize the unit. In order to maintain a predefined output level from the unit, regardless of changes in the input signal level, a small fraction of the incident light is preferably allowed to pass through a pin-hole or a back-leak in the silicon substrate, is detected by a detector 96 on the substrate and is used as a feedback signal to compensate for any changes in input power level, while the voltage applied to the phase element determines the attenuation level. The output level is maintained constant by maintaining the product of these two control signals effectively constant. The unit can thus be used as a single-chip integrated variable optical attenuator, of compact dimensions, whose attenuation level can be preset by an input voltage signal, and whose attenuation or output level can be maintained at a constant level by means of electronic feedback. All of the functions are integrated on the single chip, thus keeping the production costs low. It is appreciated that although this embodiment has been described in terms of a silicon component, it could just as readily be implemented on any other preferred opto-electronic substrate, such as gallium arsenide, germanium, indium phosphide, or any other suitable semiconductor material.

Since attenuators according to the present invention, unlike many of the prior art attenuators, are not directly dependent for their operation on manipulation of the polarization properties of the transmitted light, the above preferred embodiments have been described in terms of their operating structure as an attenuator, without consideration of the ancillary requirements of the conditions to ensure polarization independence. These requirements have been mentioned in the summary section, and are particularly relevant to embodiments which use liquid crystals as the phase changing elements, as the operation of a liquid crystal is generally dependent on the polarization of the incident light.

Figure 12A:
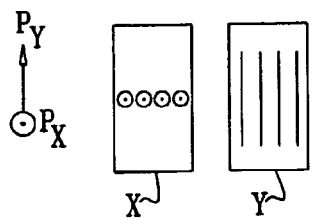
FIGS. 12A to 12C show a number of preferred configurations of phase changing liquid crystal elements, which provide attenuators of the present invention with polarization insensitive operation.
Figure 12B:
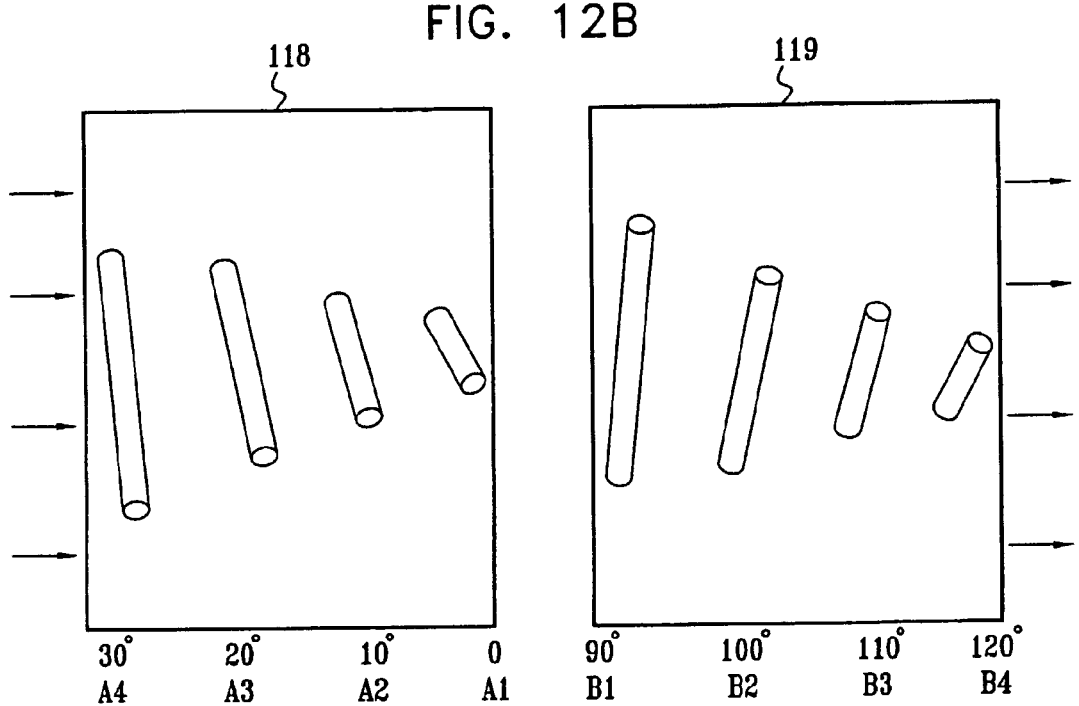
Figure 12C:
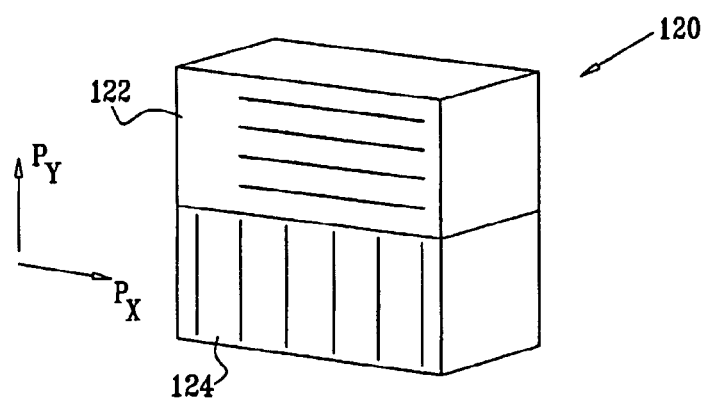

Reference is now made to FIGS. 12A to 12C, which show a number of preferred configurations of phase changing liquid crystal elements, which provide attenuators of the present invention with polarization insensitive operation.

In FIG. 12A, there is shown a preferred representation of a pair of identical parallel nematic liquid crystals, X and Y, for use together in series as a single pixel of a phase changing element in any suitable embodiment of the optical attenuators shown hereinabove. The two crystals are identical, but are mutually rotated at 90° to each other such that the alignment layers of the nematic chains of the two elements are orthogonal. An identical electric field is applied to both elements, to effect the same phase change in both. It is to be understood that the pair of liquid crystal elements shown in FIG. 12A represents only one of the pixels of the complete phase-changing element of the present invention, and that the complete phase-changing element consists of at least two such pixels in order to effect a spatial phase change in the incident signal beam. The effect of the illustrated pair of elements on the polarization of the light passing therethrough is taken as an example of the effect on the polarization of the light passing through any of the pixels of the complete phase-changing element.

An incoming light signal of any polarization direction can be split into two orthogonal polarization components, denoted $P_x$ and $P_y$ where x and y are respectively the alignment directions of the first and second liquid crystal elements. Referring now to FIG. 12A, $P_x$ is shown pointing out of the page, and $P_y$ is in the plane of the page and vertical. Each of the components is phase shifted in passage through the liquid crystal elements by an angle Φ given by the expression:

$$\Phi = nd \cdot 2\pi/\lambda$$

where n is the refractive index in the element for the polarization direction of the light, d is the length of the element in the propagation direction, and λ is the wavelength of the light. The component $P_x$ is parallel to the alignment direction of liquid crystal element X, and its phase is therefore shifted, in passage through the element, by an angle Φ1 equal to $n1 \cdot d \cdot 2\pi/\lambda$, where n1 is the refractive index in the element for parallel polarized light. After passage through element X, the $P_x$ component passes through element Y, whose alignment direction is orthogonal to the polarization direction of $P_x$, and its phase is therefore shifted by an angle Φ2 equal to $n2 \cdot d \cdot 2\pi/\lambda$, where n2 is the refractive index in the element for perpendicular polarized light. The phase shift on component $P_x$ in passing through both elements is thus $(n1 + n2) d \cdot 2\pi/\lambda$.

Component $P_y$ on the other hand, undergoes a phase shift of $n2 \cdot d \cdot 2\pi/\lambda$ in passage through the first element X, and a phase shift of $n1 \cdot d \cdot 2\pi/\lambda$ in passage through element Y, resulting in a total phase shift of $\Phi1 + \Phi2 = (n1 + n2) d \cdot 2\pi/\lambda$, identical to that undergone by component $P_x$. The net result is that both components undergo exactly the same phase change in passage through the two liquid crystal elements.

Since light having any incident polarization direction can be split up into two such orthogonal components relative to the element orientations, this combination of elements will always impart the same total phase shift to the input light, regardless of the incident polarization direction. Having undergone the same phase shift, the two components thus result in the same optical transmission loss through the attenuator, such that the attenuator is polarization independent. The actual value of phase shift imparted to the incident light is varied in the manner described above by applying identical spatially pixelated electric fields to both of the elements.

The above described structure can be expressed mathematically by the use of the Jones matrix terminology. Mx and My are the matrix representations of the X and Y elements, respectively:

$$M_x = \begin{pmatrix} e^{i\Phi 1} & 0 \\ 0 & e^{i\Phi 2} \end{pmatrix}, M_y = \begin{pmatrix} e^{i\Phi 2} & 0 \\ 0 & e^{i\Phi 1} \end{pmatrix}$$

The total Jones matrix $M_T$ of the effect of passage through both the X and Y elements can be written as follows:

$$M_T = M_y M_x = e^{i[\Phi 1 + \Phi 2]} \begin{pmatrix} 1 & 0 \\ 0 & 1 \end{pmatrix}.$$

From this expression, it is clear that for the above-described structure, $M_T$ does not alter the input polarization direction but only induces a phase change equal to $\Phi 1 + \Phi 2$ regardless of the input polarization.

Reference is now made to FIG. 12B, which is a schematic representation of an element arrangement, according to another preferred embodiment of the present invention which ensures polarization insensitive operation of the variable optical attenuators described hereinabove. Like the embodiment shown in FIG. 12A, also in FIG. 12B, the effect of the polarization independence is illustrated for passage of the light signal through one pixel of the complete phase-changing element only. In this embodiment, two liquid crystal elements 118, 119, with a twist geometry are used, each having the same overall twist angle. They are aligned in series with each other, but with the twist directions reversed, such that the propagating wave passing through one element encounters a twist in a clockwise direction, and in passing through the other element, in an anti-clockwise direction. The two elements are disposed such that at the transition from one to the other, the mutual alignment of the twist structure is 90°. It should thus be noted that FIG. 12A is a special case of FIG. 12B, in which the twist angle is zero. In FIG. 12B, a total twist angle of 30° is indicated, even though the pictorial representation of the twist direction is drawn in an exaggerated manner as more than 30°, in order that the direction of rotation be clear in the drawing. As in the embodiment of FIG. 12A, an incoming light signal of any polarization direction can be split into two orthogonal polarization components. Each of the elements, besides imparting its characteristic phase change to the light according to the element geometry and any applied field, rotates the polarization direction of each of the components by the total twist angle of each element. However, the rotation of each component of the light in passing through the first element is cancelled by the reverse rotation imparted to it in passing through the second element. Thus, for instance, the 10° rotation imparted in traversing from point A4 to A3 in element 118 is cancelled by the reverse rotation imparted in traversing from B3 to B4 in element 119, and so on through the whole of the length of the two elements. Thus the two output components when recombined recreate the input signal in intensity and polarization, but with a phase change imparted according to the element geometry, and according to any applied electric fields. Since light having any incident polarization direction can be split up into two orthogonal components relative to the element orientations, the combination of elements shown in FIG. 12B will always impart the same total phase shift to the input light, regardless of the incident polarization direction. Though the elements in the preferred example of FIG. 12B are shown as having a total twist of 30°, it is to be understood that the invention will work for any total twist angle, on condition that both elements have the same total twist angle, and that the elements are aligned with reverse rotational directions, and that the crystal alignments are orthogonal at the matching interface.

In a similar manner as was performed using the Jones matrix formalism in FIG. 12A, $M_{Ai}$ and $M_{Bi}$ can be represented as follows:

$$M_{Ai} M_{Bi} = e^{i(n1+n2)l 2\pi/\lambda} \begin{pmatrix} 1 & 0 \\ 0 & 1 \end{pmatrix}$$

where l is the thickness of virtual layers Ai and Bi, and n1 and n2 are the extraordinary and ordinary refractive indices respectively of the liquid crystals. Using this expression, the total Jones matrix for passage through all of the layers can be written as follows:

$$M_T = M_{B4} M_{B3} M_{B2} M_{B1} M_{A1} M_{A2} M_{A3} M_{A4}$$

$$= e^{i(n1+n2)l 2\pi/\lambda} M_{B4} M_{B3} M_{B2} \begin{pmatrix} 1 & 0 \\ 0 & 1 \end{pmatrix} M_{A2} M_{A3} M_{A4}$$

$$= e^{i(n1+n2)l 2\pi/\lambda} M_{B4} M_{B3} M_{B2} M_{A2} M_{A3} M_{A4}$$

$$= e^{i(n1+n2)4l 2\pi/\lambda} \begin{pmatrix} 1 & 0 \\ 0 & 1 \end{pmatrix}$$

Therefore, it is again evident that the structure shown in FIG. 12B does not alter the input polarization direction, but only induces the desired phase change regardless of the input polarization. This can be further expanded to any number of orthogonal pairs of layers compensating each other.

Reference is now made to FIG. 12C, which schematically illustrates a further arrangement for ensuring that the phase changing liquid crystal elements renders the attenuator of any of the above mentioned embodiments insensitive to the polarization of the input light. FIG. 12C is a face view of a liquid crystal element 120 divided into two separate pixels whose alignment layers are orthogonal. In pixel 122, the layers are aligned in the x-direction, and in pixel 124, in the y-direction. As previously, an incoming light signal of any polarization direction can be split into two orthogonally polarization components, denoted $P_x$ and $P_y$. The effect of transmission of the incident light signal is now considered separately for the two differently oriented pixels.

Using the nomenclature of the description of the embodiment of FIG. 12A, in traversing pixel 122, whose alignment direction is parallel to the x-direction, the component of polarization $P_x$ undergoes a phase shift proportional to n1·d. The component of polarization $P_y$ undergoes a phase shift proportional to n2·d. In traversing pixel 124, whose alignment direction is parallel to the y-direction, on the other hand, the component of polarization $P_x$ undergoes a phase shift proportional to n2·d, while the polarization component $P_y$ undergoes a phase shift proportional to n1·d. The output intensity of the $P_x$ component, resulting from the addition of the light from the two pixels, is thus proportional to (n1+n2)

·d. The output intensity of the $P_y$ component, resulting from the addition of the light from the two pixels, is also proportional to $(n1+n2) \cdot d$. The $P_x$ and $P_y$ components have both thus undergone identical phase shifts proportional to $(n1+n2) \cdot d$. The net result is that after combining the light after passage through both pixels, both components of the incident signal have undergone exactly the same overall phase change, and without dependence on the initial polarization direction of the incident signal, which determines the relative amplitude of the two components.

In operation, the application of an electric field across the liquid crystal then results in the rotation of the alignment direction in both pixels towards the direction of the field, and the consequent addition of an extra phase change to the signal according to the magnitude of the field applied. The attenuation is thus varied according to the applied electric field. It is not necessary, according to this preferred embodiment, for the electrodes to be pixelated. The function of the electrode in this embodiment is simply to apply a field across the whole of the element surface. The elements are preferably constructed such that the no-field phase change through them is a multiple of $2\pi$, such that without the application of any field, the attenuation is at its nominally zero value.

It is understood that the polarization compensation effect described above in the two pixel embodiment of FIG. 12C, is operative with any number of pixels, so long as they are arranged symmetrically in the surface of the element through which the light passes, such that a pixel with alignment in one direction always has a corresponding pixel with orthogonal alignment to compensate it.

Figure 13:
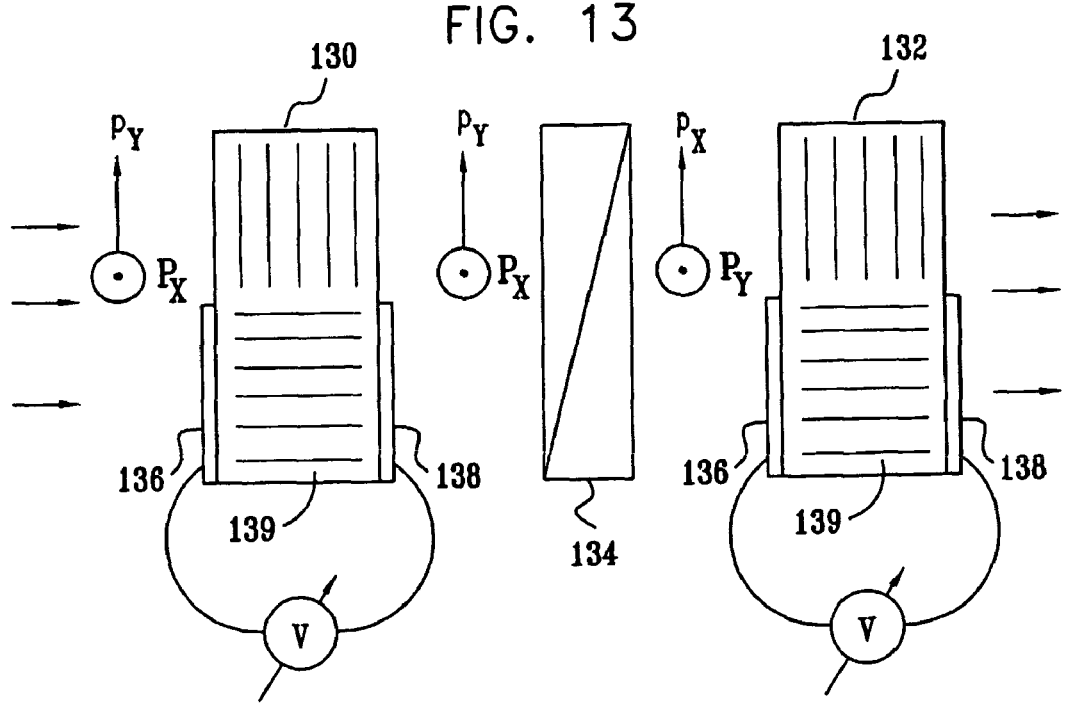
FIG. 13 schematically illustrates a further scheme for implementing polarization insensitive operation of a transmissive variable attenuator, according to a further preferred embodiment of the present invention incorporating a pair of liquid crystal elements aligned sequentially in the path of the light signal, with a half wave plate disposed between them.

Reference is now made to FIG. 13 which schematically illustrates a further scheme for implementing polarization insensitive operation of a variable attenuator, according to a further preferred embodiment of the present invention. The attenuator is made up of a pair of essentially identical liquid crystal elements 130, 132, aligned sequentially in the path of the light signal, and with a half wave plate 134 disposed between them. The half wave plate is operative to rotate the polarization of light passing through it by 90°. In its simplest embodiment, each liquid crystal element has a pair of electrodes, 136, 138, on half of the cross section to the light beam, such that each of the elements is divided into two pixels, one of variable and one of fixed phase state. Thus, when no field is applied, both pixels of each element have the same alignment, like that shown in the top part of the elements, and the elements behave uniformly to light passing through both halves. The mode pattern of the light passing through is thus not affected, and the attenuation of the device remains fixed at its insertion value. In an alternative embodiment of the attenuator, there are separate electrodes over both halves of the liquid crystal elements, and the differential voltage between them determines the difference in phase shift between light passing through the top and bottom halves.

The drawings of FIG. 13 illustrate schematically the effect of applying a voltage to the electrodes of the liquid crystal elements, such that the phase change in transit through the lower pixels is varied. The voltage V, is applied simultaneously to the electrodes of both elements. Alternatively and preferably, independent voltages are applied to each of the two elements, so that small manufacturing differences between the two elements can be compensated for. When the maximum voltage is applied, the molecules of the liquid crystal of each switched pixel are rotated to their perpendicular orientation 139, and light passing through each switched pixel undergoes a different phase change, due to the change in the refractive index of the aligned molecules. This additional phase change relative to the unswitched pixel, affects the mode structure of the propagating light, thus introducing attenuation at the output. When the voltage is at its rated maximum, the attenuation is arranged to be at its maximum value.

As previously explained in relation to the embodiments shown in FIG. 12, an incoming light signal of any polarization direction can be split into two orthogonally polarization components, denoted $P_x$ and $p_y$. The effect of transmission of the incident light signal is now considered separately for the two orthogonally oriented polarization components. The two components are unchanged in passage through the first element 130. In passage through the half wave plate, each polarization is rotated 90°, such that the $P_x$ component becomes $P_y$, and the $p_y$ component becomes $P_x$. These two components are then unchanged in passage through the second element 132. The vector addition of the two components at the output therefore has the same intensity as the input signal, but with its polarization direction rotated 90° relative to that of the input signal. Since light having any random incident polarization direction can be split up into two orthogonal components relative to the element orientations, such as the $P_x$ and $p_y$ discussed here, passage through these pixels produces the same overall effect, regardless of the incident polarization direction.

In the switched case of the lower pixels of FIG. 13, the same procedure of splitting of the incident light into orthogonal polarization components can be performed. The actuation of the switched pixel introduces an additional phase shift, as explained above. Any rotational effect introduced on the polarization will be exactly compensated for by passage through the switched bottom pixel of the second element, after the light has undergone an additional phase change of 90° in passing through the half wave plate. Thus, the polarization of the output light, just like the unswitched pixel discussed above, will have the same intensity, but with its polarization direction rotated by 90°. The attenuator thus imparts its phase change independently of the polarization direction of the incident light, thus making the attenuator polarization insensitive.

Although the above embodiment has been described in terms of liquid crystal elements divided into two pixels, it is to be understood that the invention can also be implemented using any other symmetrical division of the cross section of the light beam, such that the mode of the propagating beam is changed by the phase change generated within the elements.

Though FIG. 13 has been shown, for clarity in explaining the operation of the attenuator, with the two liquid crystal elements and the waveplate spatially separated, it is to be understood that in practically built attenuators according to this embodiment, the two separate liquid crystal elements are preferably bonded together into one integrated cell with the half phase plate sandwiched in the middle, in order to ensure sturdy and compact construction. Alternatively and preferably, the phase plate can be incorporated as the cover plate, or the substrate, or an aligning layer of one of the liquid crystal elements, thereby simplifying the construction even more.

Figure 14:
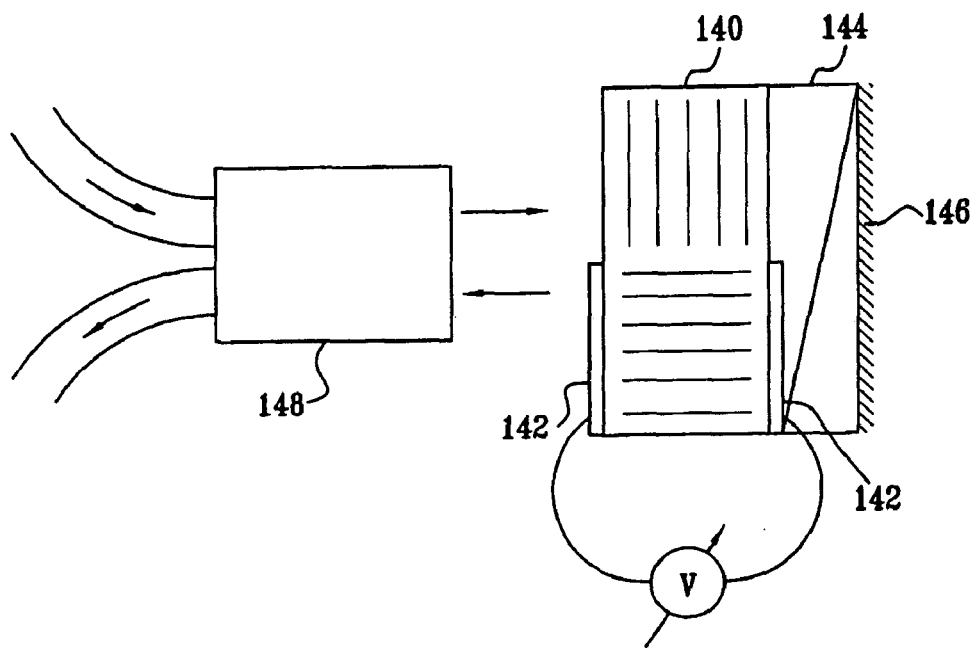
FIG. 14 schematically illustrates a reflective embodiment of the variable attenuator shown in FIG. 13, constructed using a quarter waveplate.

According to a further preferred embodiment of the present invention, the above-described variable attenuator can be constructed for use in a reflective mode. This embodiment is shown in FIG. 14. The structure of this embodiment is particularly simple, since the active parts consist of only one liquid crystal element, coupled to a quarter-waveplate. The liquid crystal element 140, as in the transmissive embodiment of FIG. 13, has a pixelated transparent electrode structure 142 preferably disposed on half of its cross section. The light transmitted through the element then traverses a quarter waveplate 144, preferably disposed in close contact with the liquid crystal element. On the further face of the quarter waveplate is disposed a reflective coating 146, such that the light is reflected back through the quarter waveplate. This reflective coating could also preferably be incorporated on a separate mirror element. The waveplate thus behaves as a half waveplate for light making the total round trip, and thus rotates the polarization of light traversing it by 90°. As with the transmissive embodiment described above, the waveplate can also be preferably incorporated as the rear cover plate, or the substrate, or an aligning layer of the liquid crystal element. A dual-fiber collimator 148 is used as the input/output device of the attenuator, as previously described in connection with the embodiment of FIG. 8. The other aspects of the operation of the attenuator are similar to those described above.

The embodiments shown in FIGS. 13 and 14 have been described using a half waveplate for the transmissive case, and a quarter waveplate for the reflective case. In keeping with common usage, it is to be understood that the term half waveplate is used and claimed in this application to describe a waveplate which results in the ordinary and extraordinary components of incident light to emerge with a phase difference corresponding to any odd number of half-wavelengths, and not just to one half wavelength. Likewise, the quarter waveplate of FIG. 14 is understood to introduce a phase difference corresponding to any odd number of quarter wavelengths between the ordinary and the extraordinary components of light passing through it. Furthermore, any other component which will rotate the polarization by the correctly required angle can be preferably used instead of the simple waveplates described in FIGS. 13 and 14.

It is further understood that all of the above-mentioned embodiments for making the attenuator polarization independent are only examples of arrangements whereby this is achieved. Any suitable embodiment, wherein the phase shift of the light through the phase shifting element or elements is arranged to be identical for two orthogonal directions of polarization, is also suitable for ensuring polarization independent operation of the variable attenuators of the present invention.

Reference is now made to FIGS. 15A to 15D which schematically illustrate several multi-channel or multi-port variable optical attenuators (VOA's) constructed and operative according to more preferred embodiments of the present invention.

Figure 15A:
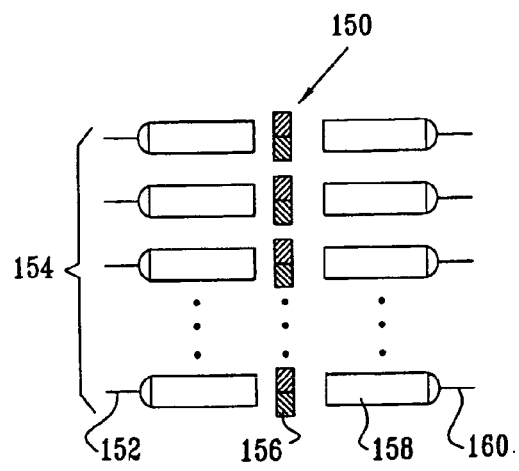
FIGS. 15A to 15D schematically illustrate preferred embodiments of multi-channel VOA's according to the present invention.

In the preferred embodiment of FIG. 15A, the multi-port VOA is constructed of an array of individual transmissive VOA's 150, such as those described in FIG. 7. The optical output of each of the incoming fibers 152 of an input array of fibers 154 is collimated and input into a pixelated phase changing element 156, such as those described hereinabove. The phase changing elements 156 are preferably constructed of a liquid crystal element. The output of each of these phase changing elements is input to a collimator 158, for output to the fiber 160 of that channel. Each pixelated phase changing element 156 is aligned separately to provide optimum performance for its own channel.

Figure 15B:
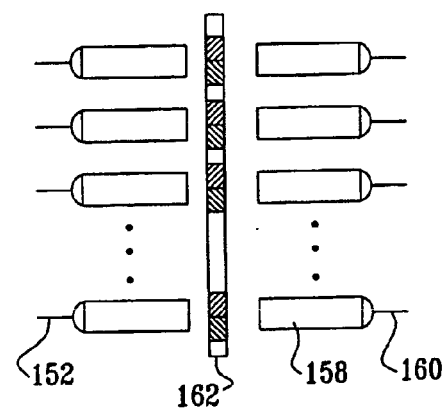

The preferred embodiment of FIG. 15B differs from the multi-port VOA of FIG. 15A in that instead of using individual pixelated phase changing elements for each channel, use is made of a single large phase-changing element array 162, through which a large number of channels are directed. The area of the phase changing element is pixelated such that each channel has its own sub-pixelated phase changing element, such that the VOA of each channel operates independently of the others. The phase changing element array 162 is preferably constructed of a liquid crystal device. Since the pixelated areas of the array 162 are fixed during manufacture of the element, alignment of the multi-port VOA is achieved during construction by aligning each individual channel separately opposite its own pixelated area of the element 162. Alternatively and preferably, if sufficient manufacturing accuracy can be provided, the complete input and output fiber arrays can be fixed in the correctly aligned position on either side of the pixelated element array 162.

Figure 15C:
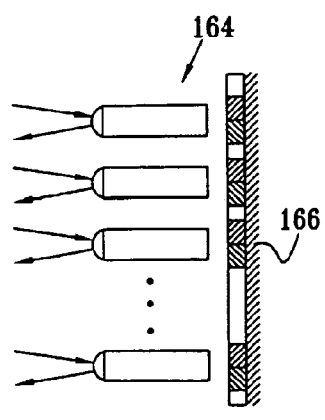

The multi-port VOA according to the preferred embodiment of FIG. 15C, differs from those of the embodiments of FIGS. 15A and 15B in that it is a reflective embodiment constructed of an array of VOA's incorporating dual fiber collimators 164, such as those described in FIG. 8. The embodiment shown in FIG. 15C, like that of FIG. 15B, uses a single, large-area phase changing element, which also incorporates a reflective layer 166 on the back side. It is to be understood that the embodiment of FIG. 15A can also be similarly adapted to operate in a reflective mode.

Figure 15D:
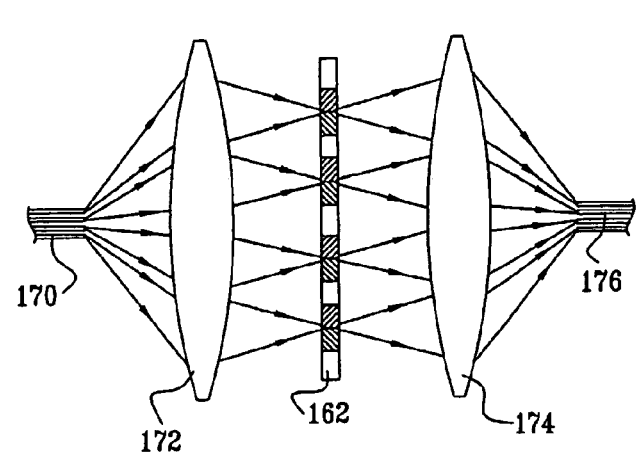

Reference is now made to FIG. 15D, which is a transmissive multi-channel VOA according to another preferred embodiment the present invention, using free space propagation from a fiber array 170, via lenses 172, 174, rather than GRIN lens collimating elements, as shown in the other multi-channel VOA embodiments, to an output fiber array 176. This embodiment is thus effectively a multi-channel version of the embodiment shown in FIG. 6. The phase changing element 162 is similar to that shown in the embodiment of FIG. 15B.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

I claim:

1. A variable optical attenuator comprising:
    an input fiber for receiving an input optical signal to be attenuated;
    an output fiber for outputting said attenuated optical signal;
    an optical path disposed between said input fiber and said output fiber, through which said optical signal passes;
    at least one pixelated liquid crystal phase changing element, disposed in said optical path such that part of said optical signal passes through at least one pixel of said at least one pixelated element; and
    a drive source applied to said at least one pixel, operative to change the phase of that part of said optical signal passing through said at least one pixel,
    wherein said at least one pixelated liquid crystal phase changing element comprises a serial pair of parallel aligned liquid crystals, orthogonally aligned such that said attenuator is insensitive to the direction of polarization of said optical signal.

2. A variable optical attenuator comprising:
    an input fiber for receiving an input optical signal to be attenuated;
    an output fiber for outputting said attenuated optical signal;
    an optical path disposed between said input fiber and said output fiber, through which said optical signal passes;

at least one pixelated liquid crystal phase changing element, disposed in said optical path such that part of said optical signal passes through at least one pixel of said at least one pixelated element; and a drive source applied to said at least one pixel, operative to change the phase of that part of said optical signal passing through said at least one pixel, wherein said at least one pixelated liquid crystal phase changing element comprises a serial pair of twist geometry liquid crystals, having the same overall twist angle but with the twist directions reversed, and disposed such that at the transition between said crystals, the mutual alignment of the twist structure is 90° such that said attenuator is insensitive to the direction of polarization of said optical signal.

3. A variable optical attenuator comprising:

an input fiber for receiving an input optical signal to be attenuated;

an output fiber for outputting said attenuated optical signal;

an optical path disposed between said input fiber and said output fiber, through which said optical signal passes;

at least one pixelated liquid crystal phase changing element, disposed in said optical path such that part of said optical signal passes through at least one pixel of said at least one pixelated element; and a drive source applied to said at least one pixel, operative to change the phase of that part of said optical signal passing through said at least one pixel, wherein said at least one pixelated liquid crystal phase changing element comprises a liquid crystal divided into at least two orthogonally aligned pixels, such that said attenuator is insensitive to the direction of polarization of said optical signal.

4. A variable optical attenuator comprising:

an input fiber for receiving an input optical signal to be attenuated;

an output fiber for outputting said attenuated optical signal;

an optical path disposed between said input fiber and said output fiber, through which said optical signal passes;

at least one pixelated liquid crystal phase changing element, disposed in said optical path such that part of said optical signal passes through at least one pixel of said at least one pixelated element; and a drive source applied to said at least one pixel, operative to change the phase of that part of said optical signal passing through said at least one pixel, wherein said at least one pixel is four pixels arranged in opposite quarters of said element, and said drive source is operative to change the phase of light passing through two diagonally opposite ones of said pixels.

5. A variable optical attenuator comprising:

an input fiber for receiving an input optical signal to be attenuated;

an output fiber for outputting said attenuated optical signal;

an optical path disposed between said input fiber and said output fiber, through which said optical signal passes;

at least one pixelated liquid crystal phase changing element, disposed in said optical path such that part of said optical signal passes through at least one pixel of said at least one pixelated element; and a drive source applied to said at least one pixel, operative to change the phase of that part of said optical signal passing through said at least one pixel, wherein said at least one pixel is an array of a number of strip pixels running across the element, said array dividing said element into approximately equal pixelated and non-pixelated areas.

6. A variable optical attenuator comprising:

an input fiber for receiving an input optical signal to be attenuated;

an output fiber for outputting said attenuated optical signal;

an optical path disposed between said input fiber and said output fiber, through which said optical signal passes;

at least one pixelated liquid crystal phase changing element, disposed in said optical path such that part of said optical signal passes through at least one pixel of said at least one pix elated element; and a drive source applied to said at least one pixel, operative to change the phase of that part of said optical signal passing through said at least one pixel, wherein said at least one pixelated liquid crystal phase changing element comprises a serial pair of parallel aligned liquid crystals with a half wave plate disposed between them, such that said attenuator is insensitive to the direction of polarization of said optical signal.

7. A variable optical attenuator according to claim 6, and wherein said half wave plate is operative as a substrate for one of said at least one pixelated liquid crystal phase changing elements.

8. A variable optical attenuator according to claim 6, and wherein said half wave plate is operative as an alignment layer for one of said at least one pixelated liquid crystal phase changing elements.

9. A variable optical attenuator comprising:

an input fiber for receiving an input optical signal to be attenuated;

an output fiber for outputting said attenuated optical signal;

an optical path disposed between said input fiber and said output fiber, through which said optical signal passes;

at least one pixelated liquid crystal phase changing element, disposed in said optical path such that part of said optical signal passes through at least one pixel of said at least one pixelated element; and a drive source applied to said at least one pixel, operative to change the phase of that part of said optical signal passing through said at least one pixel, wherein said at least one pixelated liquid crystal phase changing element comprises a liquid crystal with a quarter wave plate disposed in proximity to said liquid crystal, and also comprising a reflecting surface, and wherein said input fiber and said output fiber are disposed such that light passes by reflection between them.

10. A variable optical attenuator according to claim 9, and wherein said reflecting surface is formed on the rear side of said quarter wave plate.

11. A variable optical attenuator according to claim 9, and wherein said quarter wave plate is operative as a substrate for said at least one pixelated liquid crystal phase changing element.

12. A variable optical attenuator according to claim 9, and wherein said quarter wave plate is operative as an alignment layer for said at least one pixelated liquid crystal phase changing element.

* * * * *